Figures 3, 4, 5, 6:
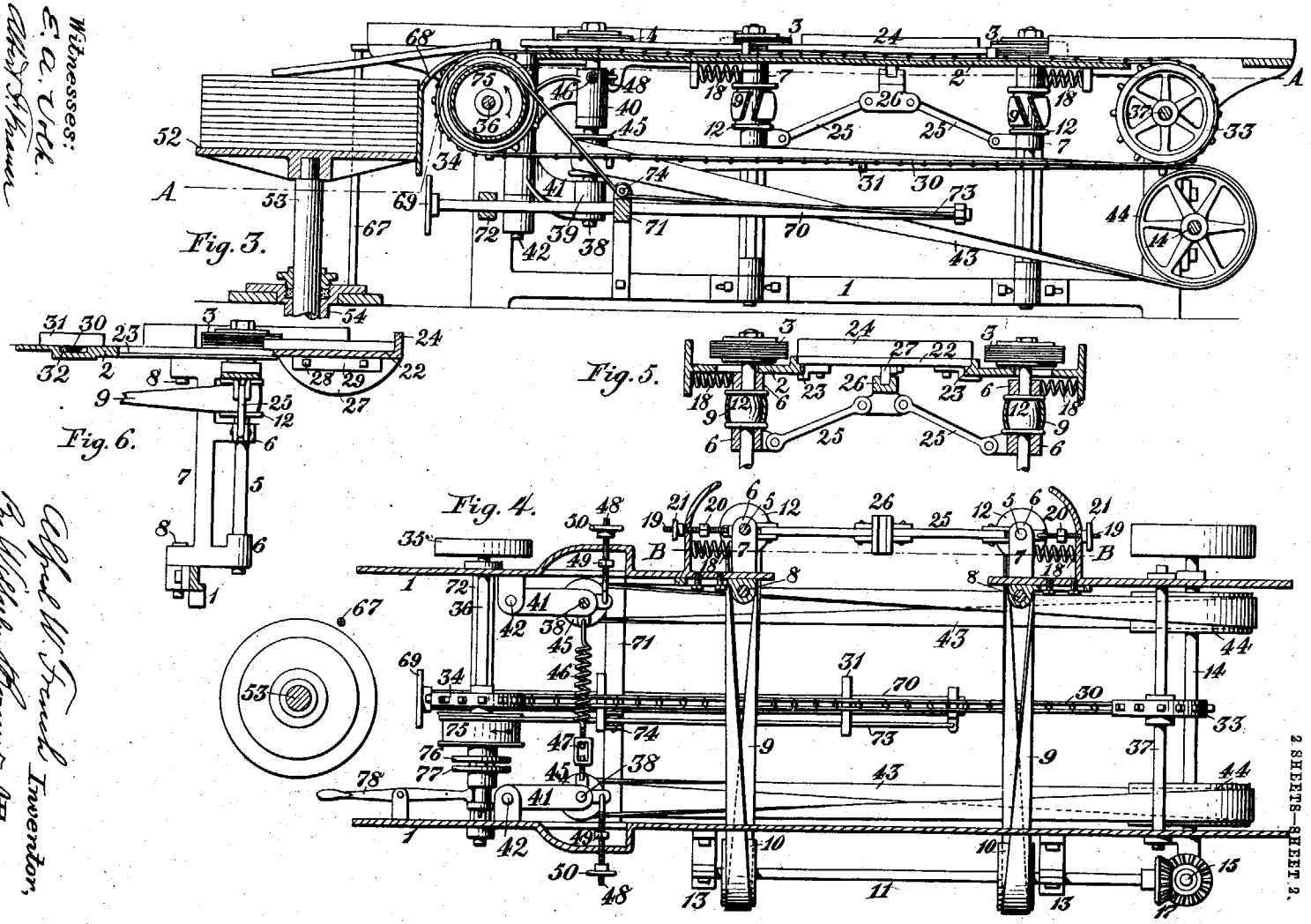

No. 12,118. REISSUED JUNE 9, 1903.
A. W. FRENCH.
MACHINE FOR TRIMMING OIL CAKES.
APPLICATION FILED DEC. 1, 1902.
2 SHEETS—SHEET 1.
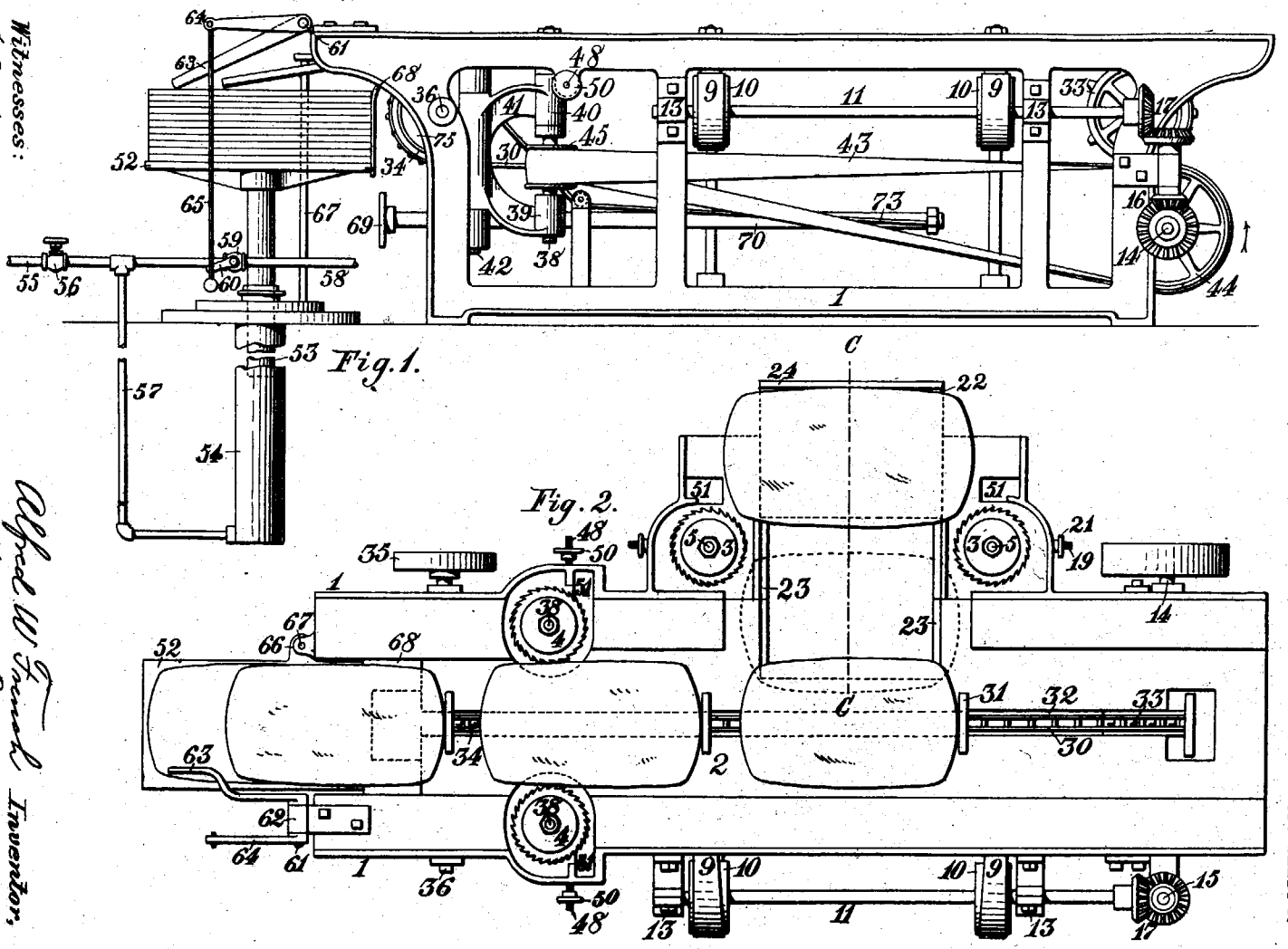
Witnesses:
E. A. Volk
Albert F. Brown
Alfred W. French Inventor,
By Wilhelm Bonn Attorneys.

No. 12,118. REISSUED JUNE 9, 1903.

A. W. FRENCH.

MACHINE FOR TRIMMING OIL CAKES.

APPLICATION FILED DEC. 1, 1902.

2 SHEETS—SHEET 2.

Witnesses:
E. A. Volk.
Albert F. Knauer

Alfred W. French Inventor,
By Wilhelm Kommer Attorneys

No. 12,118. Reissued June 9, 1903.

UNITED STATES PATENT OFFICE.

ALFRED W. FRENCH, OF PIQUA, OHIO.

MACHINE FOR TRIMMING OIL-CAKES.

SPECIFICATION forming part of Reissued Letters Patent No. 12,118, dated June 9, 1903.

Original No. 655,337, dated August 7, 1900. Application for reissue filed December 1, 1902. Serial No. 133,384.

*To all whom it may concern:*

Be it known that I, ALFRED W. FRENCH, of Piqua, county of Miami, State of Ohio, formerly of the city of Brooklyn, New York, have invented new and useful Improvements in Machines for Trimming Oil-Cakes, of which the following is a specification.

This invention relates to a machine for trimming the edges of oil-cakes by removing the soft marginal portion of the same. A machine for this purpose is described and shown in Letters Patent No. 623,241 granted to me April 19, 1899. The bulk of each oil-cake as it comes from the press is hard and compact and has been freed from oil as much as is possible in the press; but the marginal portion has not been acted upon by the press to the same extent and is therefore comparatively soft and still contains considerable oil. It is desirable to remove this soft marginal portion of each oil-cake, so that it can be again pressed for recovering the oil contained therein without, however, removing much of the hard portion of the cake, which is practically free from oil.

The main object of the present invention is to so mount the cutters, particularly those which trim the side edges of the cakes, that they will follow the outline of the hard part of the cake, which outline is usually curved and more or less irregular, so that the cutters trim off only the soft parts of the cake which still contain a considerable amount of oil. The side edges of the cake are comparatively long and the quantity of soft material along the side edges is usually considerable. It is therefore of great importance to remove this soft material and extract the oil therefrom without, however, removing any part of the hard material, the working over of which would serve no useful purpose. The transverse or end edges of the cakes are comparatively short and the line of demarcation between the soft and hard portions is less pronounced. These edges can be trimmed off in many cases to a predetermined line or shape without material loss.

Another object of my invention is to provide a simple means whereby the table or platform which receives the trimmed cakes is automatically lowered as the cakes are successively delivered upon the same, so as to keep the top of the pile of oil-cakes always at a constant level in order that the cakes coming from the machine may pile themselves without requiring any attention.

My invention has the further object to provide convenient mechanism whereby the pile of trimmed cakes may be removed from the pile-table upon a truck for transportation.

In the accompanying drawings, consisting of two sheets, Figure 1 is a side elevation of a cake-trimming machine embodying my improvements. Fig. 2 is a top plan view of the same. Fig. 3 is a vertical longitudinal section taken centrally through the machine. Fig. 4 is a horizontal section in line A A, Fig. 3. Fig. 5 is a fragmentary vertical longitudinal section in line B B, Fig. 4. Fig. 6 is a fragmentary vertical transverse section in line C C, Fig. 2.

Like numerals of reference refer to like parts in the several figures.

The frame of the machine may be constructed in any suitable manner and consists, as shown, of two upright side pieces 1 1 and a horizontal top or table 2. The oil-cake to be trimmed is first moved transversely over the table between two primary rotary cutters 3 3, which trim off the transverse or end edges of the cake and which are in this case so mounted as to trim off the end edges to a predetermined line or shape. The cake is then moved lengthwise over the table at right angles to the direction of its first movement and carried between two secondary rotary cutters 4 4, which trim off the longitudinal or side edges of the cake and which are so mounted as to follow the outline of the hard portion of the cake and remove only the soft marginal portions thereof.

The primary cutters 3 3 are arranged horizontally on opposite sides of the transverse path of the cakes and project above the surface of the table. Each primary cutter is secured to the upper end of a vertical spindle 5, which is journaled below the cutter in bearings 6. The latter are formed in the front end of a laterally-movable rock-arm or support 7, which is arranged transversely below the table and is pivoted at its inner end to the side pieces of the frame by vertical pivots 8, so that the cutter-support rocks in a horizontal plane. Each of the cutters is rotated by a twisted belt 9, passing around a pulley 10 on a longitudinal shaft 11 and a pulley 12, secured to the cutter-spindle. The longitudinal shaft 11 is journaled in bearings 13 on the side of the frame opposite to that on which the primary cutters are arranged, and the twisted belts 9 pass transversely underneath the feed-table.

14 is the main driving-shaft, which is journaled transversely in bearings on the front end of the main frame. Motion is transmitted from the main driving-shaft to the longitudinal shaft 11 by a short upright shaft 15, journaled in bearings on the frame and connected at its lower end by intermeshing bevel gear-wheels 16 with the main shaft and connected at its upper end by intermeshing miter gear-wheels 17 with the front end of the longitudinal shaft 11. The primary cutters are pressed inwardly or toward each other by two springs 18, each of which is interposed between one of the rocking arms and the adjacent part of the main frame, as represented in Figs. 3, 4, and 5. The lateral movement of each cutter is limited by an adjustable stop device, which consists, preferably, of a screw-threaded rod 19, which is arranged transversely in an opening in the side piece of the frame and connected at its inner end with one of the rock-arms and which carries inner and outer screw-nuts 20 21, adapted to bear against the inner and outer sides of the frame, respectively, as represented in Fig. 4. When no oil-cakes are passing between the primary cutters, the latter are held by the spring action in their innermost position, the movement of the cutters in this direction being limited by the outer screw-nuts 21 engaging with the outer sides of the frame, as represented in Fig. 4.

The cakes are fed to the primary cutters by a primary feed device, which preferably consists of a reciprocating carriage or board 22. This carriage is guided in ways 23, arranged on the table between the primary cutters, and is provided at its outer end with a raised flange or rib 24, which abuts against the outer end of the cake.

For the purpose of trimming off the edges of the cake to a convex or other shape which the trade demands the inward-and-outward movement of the cutters is controlled by a shifting device which is operated by the carriage as the latter feeds the cake past the cutters. This shifting device, as shown in Figs. 3, 4, 5, and 6, consists of a pair of transverse toggle-bars 25, which are pivoted at their lower outer ends to the rock-arms of the primary cutters, a bearing-shoe 26, pivotally connected with the elevated inner ends of the toggle-bars, and a depending cam 27, detachably secured by bolts 28 to a flange 29 on the under side of the carriage and adapted to bear against the bearing-shoe of the toggle-bars. As the operator places the cake on the carriage and then pushes the same forwardly between the primary cutters the cam 27 engages with the bearing-shoe and depresses the same, thereby straightening the toggle-bars and causing the cutters to be shifted and produce a correspondingly-shaped cut on the end edges of the cake. As shown in Fig. 6, the cam is provided with a convex bearing-face which causes the cutters to be gradually separated from the beginning of the cutting action on the cake until the middle of the end edges have been reached and to gradually approach each other during the second half of their cutting action on the cake, by which means the end edges of the cake are trimmed in a curve or on a rounded convex line, as shown in Fig. 2. By varying the shape of the face of the cam the movement of the cutters may be varied, so as to cut the edges of the cakes in any desired shape. After the end edges of the cake have been trimmed by the primary cutters the operator moves the cake into engagement with a secondary feed device, which is arranged in rear of the primary feed device and at right angles thereto and which carries the cake between the secondary cutters for trimming off the sides or longitudinal edges of the cake. The operator then moves the carriage back preparatory to feeding the next cake between the primary cutters.

The secondary feed device as shown in the drawings consists, preferably, of a feed belt or chain 30, having propelling-wings 31, which engage the rear edges of the cakes. This chain is arranged with its upper feeding portion in a longitudinal slot or groove 32 in the table and runs around sprocket-wheels 33 34, arranged at the ends of the table. The feed-chain is driven by a belt running around a pulley 35, mounted on a transverse shaft 36, which carries the delivery sprocket-wheel 34. The receiving sprocket-wheel 33 is mounted on a transverse shaft 37, arranged in the front part of the frame.

The secondary cutters, which trim the side edges of the oil-cakes, are arranged horizontally on opposite sides of the rear part of the table and project above the surface of the table into the path of the cakes. Each cutter is secured to the upper end of a vertical spindle 38, journaled at its lower end and near its upper end in bearings 39 40, which are formed in the front end of a laterally-movable bifurcated rock-arm or supporting-frame 41. The latter is arranged lengthwise below the feed-table and is pivoted at its rear end to the side pieces of the frame by a vertical pivot 42, so that the arm rocks in a horizontal plane. Each of the secondary cutters is rotated by a twisted belt 43, passing around a pulley 44 on the main driving-shaft 14 and a pulley 45, secured to the cutter-spindle between its bearings.

The cutters are pressed inwardly or toward each other by one or more springs, which hold the cutters yieldingly to their work and allow the cutters to recede or move outwardly as the outline of the hard portion of the cake renders this necessary. As shown in Fig. 4, a single spring 46 is employed, which connects both cutters. This spring may be connected directly with one of the rock-arms 41, while its other end is connected with the other rock-arm by a turnbuckle 47, whereby the tension of the spring may be adjusted.

The lateral movement of each secondary cutter may be limited by an adjustable stop device, which prevents the cutters from assuming an abnormal position and which is constructed like that of the primary cutters. This stop device, as shown, consists of a screw-threaded rod 48, which is arranged transversely in an opening in the side piece of the frame and connected at its inner end with one of the rock-arms and which carries inner and outer screw-nuts 49 50, adapted to bear against the inner and outer sides of the frame, respectively, as represented in Figs. 3 and 4. When no oil-cakes are passing between the secondary cutters, the latter are held by the spring action in their innermost position, the movement of the cutters in this direction being limited by the outer screw-nuts 50 engaging with the outer sides of the frame. As a cake passes between the cutters the latter engage with the side edges of the cake and remove the soft edge portions therefrom, but do not cut into the hard part of the cake to any appreciable extent. The cutters follow the variation in the outline of the hard part of the cake, thereby removing and saving all parts of the cake bearing an excess of oil, but do not remove any of the hard part from which the oil has been pressed. The material which is removed by the cutters is discharged through openings 51, formed in the table adjacent to the cutters, as shown in Fig. 2.

If desired, the primary cutters may be mounted, like the secondary cutters, to follow the outline of the hard portion of the cake.

The receiving-table and the mechanism by which it is automatically lowered are constructed as follows:

52 represents a horizontal table or platform which is arranged adjacent to the discharge end of the feed-table and which receives the cakes one upon the other as they are successively discharged therefrom. This receiving-table is mounted on the upper end of a vertically-movable plunger 53, which is arranged with its lower end in an upright hydraulic cylinder 54.

55 represents the pressure-pipe, which is provided with a hand-valve 56 and connected by a branch pipe 57 with the lower end of the hydraulic cylinder.

58 represents a vent or escape pipe provided with a valve 59 and connected with the branch pipe 57. The valve 59 is normally held closed by a weighted arm 60, connected with the rocking-stem of this valve.

61 represents a short rock-shaft journaled in a bearing 62 on the rear end of the feed-table and provided at its inner end with an actuating or trip rock-arm 63 and at its outer end with a transmitting rock-arm 64, both of which project rearwardly. The inner rock-arm 63 projects over the receiving-table or the pile of cakes resting thereon, and the outer rock-arm 64 is connected by a rod 65 with the rock-arm of the escape-valve 59.

In order to make the table ready to receive a pile of cakes, the table is raised nearly to the top of the feed-table. This is effected by opening the hand-valve in the pressure-pipe, which admits the pressure fluid into the hydraulic cylinder, the escape-valve being shut, so that the pressure liquid cannot escape, and the force of the latter is exerted in raising the table. When the top of the receiving-table has been raised nearly to the level of the feed-table, the hand-valve in the pressure-pipe is closed. In this position of the receiving-table the latter just reaches the under side of the rock-arm 63, but does not raise the same, thereby holding the escape-valve shut and causing the receiving-table to be held in an elevated position by the liquid confined below the piston. If desired, the pressure-pipe valve may be left open until the receiving-table has been raised until it raises the rock-arm 63, which immediately opens the escape-valve, thereby allowing the pressure liquid to escape, thus indicating to the operator that the receiving-table has been raised to its highest position. As soon as the liquid escapes from the escape-pipe the operator closes the valve in the pressure-pipe. The receiving-table now descends, owing to the escape of the liquid through the open escape-valve, and when the receiving-table descends to its normal position below the top of the feed-table the rock-lever 63, which descends with the table, closes the escape-valve, and thereby stops the descent of the receiving-table. As the trimmed oil-cakes are delivered successively from the feed-table upon the receiving-table, each cake passes along the under side of the rock-arm 63, whereby the latter is lifted and the escape-valve is opened, thereby permitting the liquid to escape from the cylinder and causing the receiving-table to descend. When the receiving-table and pile of cakes resting thereon have been lowered to the extent of the thickness of a cake, the actuating rock-arm 63 has been lowered sufficiently to close the escape-valve, thereby stopping the descent of the receiving-table. This operation is repeated for each cake which is delivered upon the receiving-table, whereby the latter is lowered intermittently by gravity and in the same measure as the cakes are fed upon the pile, thereby keeping the top of the pile always at the same relative height with the top of the feed-table.

The feed-table is preferably guided in its vertical movement by a guide-lug 66 projecting laterally therefrom and sliding on an upright rod 67, which is secured at its upper and lower ends to the frame of the machine and the floor. In order to deliver the cakes properly from the feed-table to the receiving-table and cause the rear end of the cake to be disengaged from the wings of the feed-chain, a guide 68 is provided. This guide consists, preferably, of a plate which is notched to permit the same to straddle the upper part of the delivery sprocket-wheel and which extends from opposite sides of this wheel in line with the top of the table rearwardly and downwardly in an eccentric curve away from the feed-chain to the front side of the receiving-table. The cakes are carried by the wings of the feed-chain from the feed-table along the curved or inclined guide-plate. As the cakes move along the guide-plate the eccentric curve of the latter causes the cakes to be gradually stripped from the wings, and when the cakes have been disengaged from the wings their forward movement upon the table or the pile is completed by sliding down the curved plate, aided by the weight, if necessary, of the succeeding cakes which are delivered upon the pile.

The machine is preferably provided with a mechanism for removing the pile of cakes from the receiving-table from time to time upon a wheeled truck or other receiver. This mechanism is constructed as follows:

69 represents a pusher-head which is normally arranged in front of the pile-receiving table and secured to the rear end of a horizontal pusher-rod 70. This rod is arranged lengthwise in the lower part of the machine and guided in cross-bars 71 72, connecting the side pieces of the frame.

73 represents a cord, steel wire, or chain which passes with its intermediate portion underneath a guide-roller 74 on the cross-bar 71 and which is secured with its front end to the front end of the pusher-rod, while its rear end is wound upon a drum 75. This drum is mounted loosely on the shaft 36 of the delivery sprocket-wheel and is provided on one side with a friction-clutch jaw or disk 76, which is adapted to be engaged by a corresponding friction clutch jaw or disk 77, which slides lengthwise on the shaft 36, but is compelled to turn therewith by a spline or key. The clutch-disk 77 may be moved into and out of engagement with the clutch-disk 76 by any suitable means—for instance, by means of a hand-lever 78, as shown in Fig. 4. When the pile-receiving table has passed below the pusher-arm and it is desired to push the pile from the receiving-table, the clutch-disk 77 is engaged with the clutch-disk 76 of the drum, thereby causing the drum to turn with the shaft 36 in the direction of the arrow. This causes the cord or wire 73 to be wound upon the drum and the pusher-rod to be moved rearwardly, so that its pusher-head engages the front side of the pile of cakes and pushes the pile from the receiving-table upon a truck or other receiver. The clutch-disk 77 is then disengaged from the clutch-disk 76, and the pusher-rod is moved forwardly into its normal position by the operator, during which movement the cord or wire is unwound from the drum and the latter is turned backwardly.

I do not wish to confine the use of the devices described in this application to a machine for trimming oil-cakes, because the same may be used for operating upon similar material in a like manner.

I claim as my invention—

1. The combination of a feed-table, means for moving the cakes over the table in being trimmed, a cutter arranged above the table, and a yielding tension device which resists the outward movement of the cutter and holds the latter yieldingly against the edge of the cake, substantially as set forth.

2. The combination of a feed-table, means for moving the cakes over the table in being trimmed, a cutter arranged above the table, a rocking cutter-support arranged to swing toward and from the edge of the cake, and a yielding tension device which resists the outward movement of the cutter and holds the latter yieldingly against the edge of the cake, substantially as set forth.

3. The combination of a feed-table, means for moving the cakes over the table in being trimmed, cutters arranged above the table at both sides thereof and adapted to operate against the edge portions of the cakes which pass between them, movable supports for the cutters mounted to move toward and from each other, and a yielding tension device which resists the movement of the cutters away from each other and holds the cutters yieldingly against opposite edges of the cake, substantially as set forth.

4. The combination with a feed-table over which the cakes are moved in being trimmed, of a rotary cutter arranged parallel with said table and mounted to be capable of free movement inwardly, and a yielding tension device which resists the outward movement of the cutter and holds the latter yieldingly against the edge of the hard portion of the cake, whereby the cutter is caused to follow the irregular outline of the hard portion, thus removing only the soft portion outside of the hard portion of the cake, substantially as set forth.

5. The combination with the feed-table, of a feed-board movably mounted thereon and provided on its under side with a longitudinal pattern-cam, rotary cutters arranged on opposite sides of the feed-board, transversely-movable supports carrying said cutters, a shoe in which said cam engages, toggle-bars extending from said shoe in opposite directions to said cutter-supports and moving the cutter-supports outwardly, and means whereby the cutter-supports are moved inwardly, substantially as set forth.

6. The combination with the feed-table and the cutters, of a vertically-movable table which receives the cakes successively from the feed-table, a restraining mechanism which resists the descent of the receiving-table, and an automatic releasing device which is actuated by each cake as it moves to the receiving-table and which releases the restraining mechanism for every cake fed upon the receiving-table and allows of a corresponding downward movement of the receiving-table, substantially as set forth.

7. The combination with the feed-table and the cutters, of a vertically-movable table which receives the cakes from the feed-table, a hydraulic device whereby the receiving-table is raised and which resists its descent, and a trip device which is actuated by the movement of the cakes from the feed-table to the receiving-table and which controls the hydraulic device and through it the descent of the receiving-table, substantially as set forth.

8. The combination with the feed-table, of a vertically-movable table which receives the cakes from the feed-table, a plunger carrying the receiving-table and arranged in a hydraulic cylinder, a pressure-pipe connected with said cylinder and having a valve, an escape-pipe connected with said cylinder and having an escape-valve, and a trip device which is connected with the escape-valve and which is adapted to be shifted by the movement of the cakes from the feed-table to the receiving-table, thereby opening the escape-valve, substantially as set forth.

9. The combination with the feed-table, of a vertically-movable table which receives the cakes from the feed-table, a plunger carrying the receiving-table and arranged in a hydraulic cylinder, a pressure-pipe connected with said cylinder and having a valve, an escape-pipe connected with said cylinder and having an escape-valve, a rock-shaft provided with a transmitting-arm which is connected with said escape-valve and with a trip-arm which is adapted to rest on the receiving-table, or on the pile of cakes, and which is actuated by the movement of the cakes from the feed-table to the receiving-table, substantially as set forth.

10. The combination with the feed-table, the horizontal rotary cutters arranged above said table and the vertically-movable receiving-table arranged at one end of the feed-table and below the level thereof, of a horizontal pusher-rod arranged in guides below said feed-table to move toward and from the receiving-table, a rotary drum for actuating said pusher-rod, and a flexible connection extending from said drum to said rod, substantially as set forth.

Witness my hand this 11th day of November, 1902.

ALFRED W. FRENCH.

Witnesses:
H. W. BROWN,
FRANK S. LAWRENCE.